US006535162B1

(12) United States Patent
Butler

(10) Patent No.: US 6,535,162 B1
(45) Date of Patent: Mar. 18, 2003

(54) LOW COST SYSTEM BUILT-IN-TEST FOR CW RADAR

(76) Inventor: Walker Butler, 11837 N. Paradise Dr., Scottsdale, AZ (US) 85254

( * ) Notice: Subject to any disclaimer, the term of this patent is extended or adjusted under 35 U.S.C. 154(b) by 0 days.

(21) Appl. No.: 09/683,223

(22) Filed: Dec. 4, 2001

(51) Int. Cl.[7] .................................................. G01S 7/40
(52) U.S. Cl. ........................ 342/165; 342/173; 342/174
(58) Field of Search .............................. 342/165, 173, 342/174

(56) References Cited

U.S. PATENT DOCUMENTS

| | | | | |
|---|---|---|---|---|
| 3,750,171 A | * | 7/1973 | Faris | 342/112 |
| 3,774,206 A | * | 11/1973 | Rauch | 342/89 |
| 3,993,996 A | * | 11/1976 | Milan | 342/165 |
| 4,679,049 A | * | 7/1987 | Riffiod | 342/172 |
| 5,432,516 A | | 7/1995 | Cherry et al. | 342/28 |
| 5,886,663 A | | 3/1999 | Broxon, II et al. | 342/165 |

* cited by examiner

*Primary Examiner*—John B. Sotomayor
(74) *Attorney, Agent, or Firm*—Michael Dryja; Don I. Carnegie

(57) ABSTRACT

An apparatus for testing the operation of a CW radar is disclosed. A test antenna is placed within the field of radiation of the radar's transmit and receive antenna. The sample of millimeter wave energy collected by the test antenna is coupled to a switch that routes the sample to either a dissipative load or to a reflective short. When the sample is coupled to the load the energy is absorbed. When the test antenna is coupled to the short, the sample is reflected back to the test antenna and re-radiated. A control signal produced by a square wave generator is coupled to the switch and determines whether the sample is absorbed or reflected. The result is the re-radiation of an amplitude modulated sample of the energy transmitted by the radar to form a test signal. Means are provided to adjust the frequency of operation of the square wave generator.

15 Claims, 4 Drawing Sheets

LOW COST SYSTEM BUILT-IN-TEST FOR CW RADAR

BACKGROUND OF INVENTION

The present invention relates generally to continuous wave radars and, more particularly, to test circuitry and a related method of testing to evaluate the performance of the radar system.

Continuous wave (CW) radars have the capability to determine target distance and relative velocity, and thus are used for many different purposes. Either one, or both, of these measurement parameters can be determined depending upon the application. The CW radar is especially adaptable to the detection and measurement of targets at relatively short distances, with some examples being automobile speed determination for traffic enforcement, ground proximity warning radar for airborne use, and intrusion detection in both permanent and temporary installations.

A fundamental characteristic of the CW radar is that transmission and reception occur simultaneously, in contrast to a pulse radar that transmits first and then receives target returns after the transmitter shuts off. In the CW radar the difference in frequency between the transmitted and received signals is analyzed to detect the target and determine parameters of interest. Many variations of the CW radar exists, including frequency modulated CW (FM-CW), frequency shift keying (FSK-CW), pseudo-random coded (PN-CW), as well as the basic fixed frequency CW radar. The modulation characteristics of the transmitted signal are tailored to meet the application requirements.

One modulation example is the transmission of a continuous wave at a fixed frequency in a simple radar to determine the velocity of approaching or receding automobile targets. The Doppler shift in the reflected signal is processed to determine the target's relative velocity, but no determination of range is possible. Another example involves continuous transmission of a triangularly modulated signal made up of positive and negative, highly linear changes of frequency with time. The slope of the transmitted signal will determine how the frequency difference due to distance is combined with the difference produced by any relative velocity. The returns from targets during the positive slope are compared with returns during the negative slope to allow determination of both distance and relative velocity of the target.

In many applications, it is highly desirable that the CW radar be small in size, relatively low cost, and highly reliable during operation. A radar of small size normally operates in the microwave or millimeter wave portion of the electromagnetic spectrum. The radar should also be designed to be placed into operation with a minimum of test and adjustment. What is needed is a means to conduct a self-test of all major subsystems of the radar, both at first activation and periodically during operation without the need for external test equipment. This means should be integral to the radar, simple to operate, and not add significant cost.

Prior art examples of radar self-test apparatus and methods having some similarity to the present invention include Cherry, et al., U.S. Pat. No. 5,432,516, This patent describes a means to extract a sample of the signal being transmitted, a switch coupled to the sampling means and to a delay unit that is in turn coupled to an antenna. This antenna is positioned in such a manner that the delayed signal is coupled into the field of radiation of the main antenna used for transmission and for receiving signals reflected from targets. When a test of the overall radar performance is undertaken, the switch is closed and the delayed signal enters the main antenna to be processed in the same manner as a target return. An apparent target, that appears at the appropriate amplitude and range corresponding to the delay provided by the delay unit, is an indication that all radar subsystems are functioning properly. The test target appears at a fixed range determined by the characteristics of the delay unit, no provision is made to vary the range radar response at different ranges. The delay unit used in this design often requires relatively expensive components and significant volume, and thus adds cost to the radar. The present invention does not require such a delay unit, and allows the range of the test target to be varied.

Another example of prior art is provided by Broxon, et al., U.S. Pat. No. 5,886,663. Disclosed is the use of a modulation diode positioned within the field of radiation of the radar antenna. This diode is driven to conducting and non-conducting states by a low frequency signal generator that is activated when a test of the radar is performed. When conducting, the diode changes the voltage standing wave ratio of the radar antenna, thus reducing its gain. Targets external to the radar and within the field of radiation reflect the transmitted signal back to the antenna where it is received and processed. When the diode is conducting, the reduced gain of the antenna results in a reduction of the amplitude of the received signal. A comparison of the processed target signals with the diode conducting and non-conducting allow determination of the status of the radar subsystems. The test requires the existence of a target or targets of opportunity within the field of radiation of the radar antenna.

These prior art examples either require complex auxiliary circuitry to perform the needed system testing and thus add significant expense to the radar, or in the case of Broxon, et al., the existence of external targets are required. Thus, a need exists for a highly efficient and economical self-test capability for use in CW radars that is capable of determining the overall operability of the radar, including its antenna, interconnecting cables, and all electronic subsystems. This self-test capability should be independent of the external environment of the radar and function either upon command or automatically on a periodic basis. For these reasons, as well as other reasons, there is a need for the present invention.

SUMMARY OF INVENTION

Accordingly, the present invention provides a new and improved method for evaluating the performance of a CW radar. It is an advantage of the present invention that only a small number of relatively inexpensive components are required in its fabrication. It is also an advantage of the present invention that the testing process includes collecting a small sample of the radar's radiated beam and imposing modulation on this sample by alternately coupling the line conducting the sample to a dissipative load or to a reflective short. The result is substantial amplitude modulation imposed upon the sample to form a test signal with frequency content related to the rate of switching between the two terminations. The test signal is re-radiated in such a manner that a portion is received by the radar's antenna. Within the radar, the test signal is amplified by the receiver, processed by the frequency analyzer and presented on the display as a test target. Therefore; every major circuit within the radar is exercised by the test method, and any circuit failure will be indicated by the diminished or non-existence of a displayed test target. It is a further advantage of the present invention that the test target can be varied in range throughout the radar's range limits. Any range dependent failure in the radar's circuitry can thus be identified. Still other advantages, aspects, and embodiments of the invention will become apparent by reading the detailed description that follows, and by referencing the attached drawings.

BRIEF DESCRIPTION OF DRAWINGS

A more complete understanding of the present invention may be derived by reference to the detailed description and the claims when considered in connection with the accompanying drawings in which like reference numbers represent similar parts, and wherein:

DETAILED DESCRIPTION

Unknown; Michael Dryja; In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
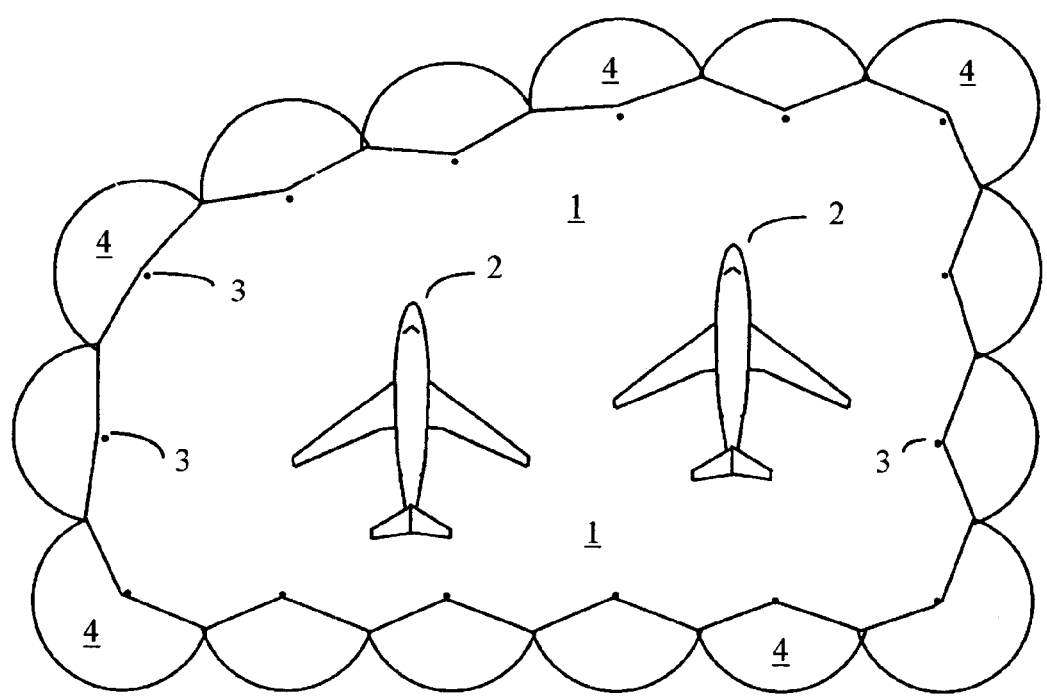
FIG. 1 is a block diagram of an example FM-CW radar that includes the self-test capability, according to an embodiment of the invention.

For exemplary purposes, FIG. 1 is a block diagram of a typical FM-CW radar. The modulator 1 controls the frequency modulation sweep time, frequency deviation, and modulation repeat rate of the digitally controlled oscillator (DCO) 2 to form the FM modulated emissions. For this example it is assumed that a common modulation waveform is used that has a "sawtooth" pattern that begins at an initial frequency, undergoes a highly linear, positive change of frequency with time until an upper frequency is reached, then emission is interrupted briefly to allow a return to the initial frequency where the pattern is repeated. Those skilled in the art often refer to each change of frequency with time as a sweep. This modulation waveform is most useful for the detection of fixed or slowly moving targets. The DCO 2 output signal is passed through coupler 3 and circulator 4 to the radar antenna 5. The radar antenna produces a radiation field, commonly referred to as a beam, having beam dimensions appropriate to the radar's application.

The radar antenna 5 simultaneously transmits energy and receives energy reflected from objects within the radar antenna beam. The received energy is routed by the circulator 4 to the mixer 6. The coupler 3 samples a portion of the DCO 2 output signal and supplies it to the mixer wherein the DCO output sample and the received signal are heterodyned to form a signal with frequency content that is the difference between those of the two mixer inputs. The portion of the mixer output signal of interest can range in frequency from substantially zero to several hundred kiloHertz, and is often referred to as the baseband spectrum by those skilled in the art.

The return from a single target within the radar antenna beam is a replica of the DCO output signal reduced in amplitude and delayed in time in keeping with the well known ranging principles of radar. At any point in time, the difference in frequency between the FM modulated, transmitted and received signals is a function of their time separation due to target range. The frequency difference, $F\_d$, for a fixed position target will remain constant during the entire sweep time. Those skilled in the art will recognize that the relationship of the difference frequency to other significant parameters is given by equation 1: $F\_d=(2\times R\times delta\_F)/(c\times T\_s)$, where R is the range to the target, $delta\_F$ is the frequency deviation, c is the speed of light, and $T\_s$ is the modulation sweep time targets at greater ranges produce higher frequency signals. Each target at a different range will yield a signal component characterized by a frequency in keeping with the relationship above and an amplitude related to its radar cross section and range. The sum of all signals from all targets within the baseband spectrum comprises the main output of the mixer 6 that is supplied to the receiver 7 where this baseband signal is amplified and band limited for optimum target detection performance.

The frequency analyzer 8 processes the amplified version of the composite baseband signal provided by the receiver to detect the presence of targets of interest. This frequency analyzer may include tracking filters, multiple comb filters, or an analog-to-digital converter coupled with a Fast Fourier Transform digital processor to evaluate the frequency content of the baseband signal. When targets of interest are detected, their existence and characteristics are supplied by the frequency analyzer to the display device 9. The display may actually be located at a remote location from the operating position of the radar. In such cases, a wireline connection or a radio frequency (RF) link may be used to transfer the target detection data to the display.

The control 10 forms an operator interface to the radar and allows control of its overall operation. FIG. 1 only shows interconnections from the control 10 to the modulator 1, the display 9, and the self-test block 11. Connections are also provided to all other subsystems as required. Control functions include operation on and off, selection of modulation patterns and frequency limits, receiver gain, display parameters, and self-test initiation.

Figure 2:
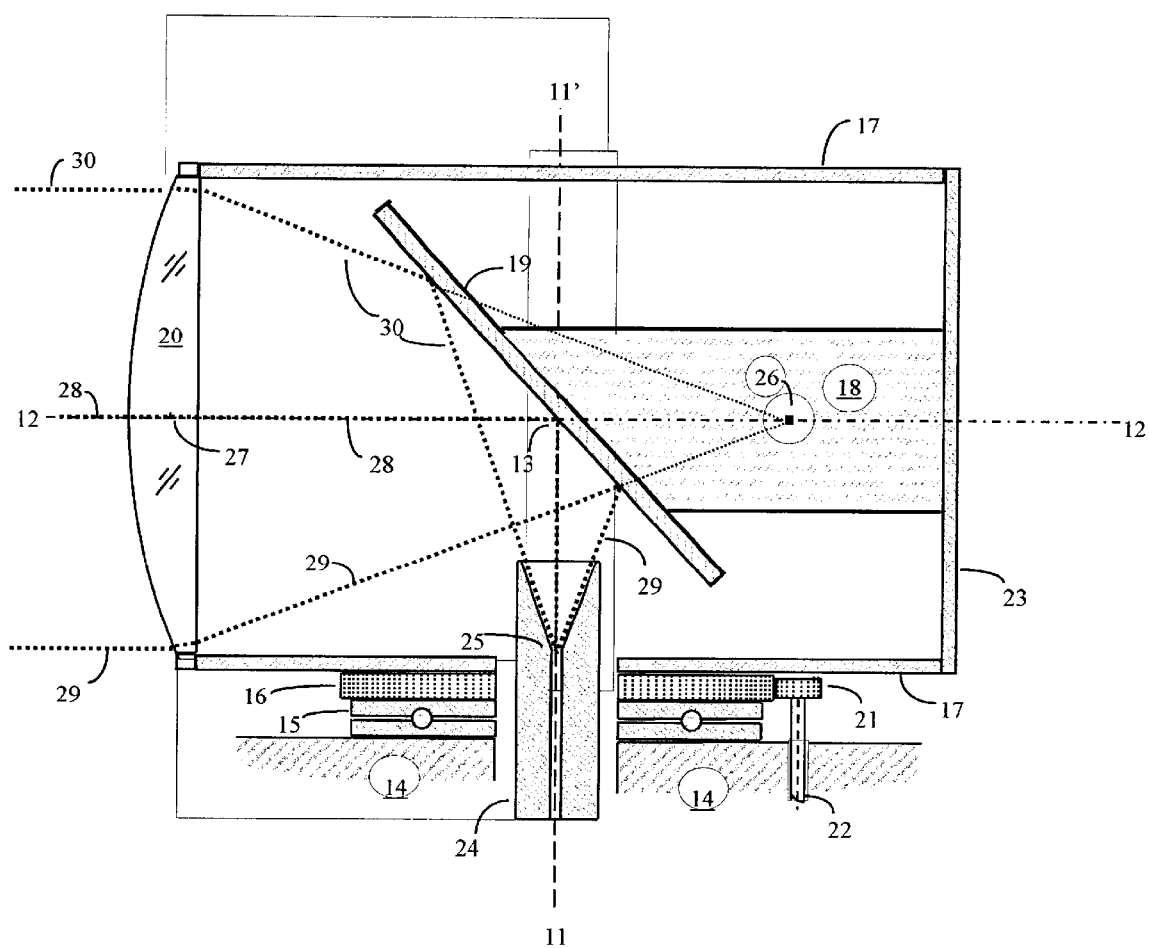
FIG. 2 provides a top level diagram of a parallel configuration for the self-test function, according to an embodiment of the invention.

The FM-CW radar configuration depicted in FIG. 1 is well known to those skilled in the art. The present invention includes the addition of the self-test capability provided by the self-test block 11, the test antenna 12, and associated interface with the remainder of the radar. FIG. 2 provides a top level diagram of the self-test function to allow understanding of its principle of operation. The configuration shown can be referred to as a parallel configuration. The test antenna 12 is a small antenna positioned within the field of radiation of the radar antenna 5; an example position is immediately in front of one edge of the radar antenna aperture. This test antenna intercepts a small amount of the transmitted energy and does not affect the voltage standing wave ratio or normal operation of the radar antenna 5. The test antenna is coupled to the switch 14 by way of an appropriate line 13 that may have the form of a microwave stripline or waveguide.

Switch 14 is driven to either one of two positions by switch driver 15. In one position line 13 coupled to line 16. In the other position, line 13 is coupled to line 17.

The distal end of line 16 is terminated by a dissipative load 18 that is matched in impedance to the characteristic impedance of lines 13, 16, and 17. As a result, when switch 14 couples line 13 to line 16 substantially all the energy collected by the test antenna 12 is consumed in the dissipative load 18.

The distal end of line 17 is terminated by a shorting structure 19. It is well known by those of skill in the art that when a mechanism for conducting electromagnetic energy is terminated by an electrical short, a substantial amount of the energy arriving at the short is reflected back via the conductive mechanism toward the energy source. Therefore; when switch 14 couples line 13 to line 17 a substantial portion of the microwave energy collected by the test antenna is reflected back from the shorting structure to be reradiated by the test antenna.

Switch driver 15 produces a square wave output signal that controls the position of switch 14. Thus, the switch connects line 13 alternately to lines 16 and 17, with each position be connected for substantially one-half the time. The dissipative load 18 and shorting structure 19 are alternately coupled to the test antenna 12 with the result that the reradiated microwave energy is amplitude modulated by the square wave signal from the switch driver 15. The repetition rate or frequency of the square wave signal is selected by the radar operator and typically is adjustable.

A portion of the amplitude modulated sample of the FM-CW radar's transmitted energy is reradiated by the test antenna and collected by the FM-CW radar antenna 5 along with any returns from targets within the radar antenna beam. When this self-test signal is mixed with the DCO output sample in mixer 6 the difference between these two signals is a baseband signal having frequency components that are a function of the square wave modulation. The self-test signal is processed by the radar receiver 7 and frequency analyzer 8 in the same manner as other target returns. The frequency analyzer separates these self-test signal components from any other target returns and supplies target positional data for any actual targets and self-test targets to display 9. The primary self-test target has a displayed range that is a function of the repetition frequency of the square wave modulation. Other lower amplitude, self-test targets are produced at ranges related to harmonics of the modulation frequency.

An appropriate repetition frequency for the square wave output signal generated by switch driver 15 can be selected with the aid of equation 1. A self-test target range is selected that is less than the maximum operating range of the radar. This target range is then inserted into equation 1 along with known radar parameters and the resulting frequency, $F\_d$, is the required frequency for the switch driver. A mechanism to vary the frequency of the switch driver square wave output can be included as a part of its circuitry. Adjusting the square wave frequency while observing the display 9 allows observation of the test target moving to any desired apparent range within the operating range limits of the radar.

Figure 3:
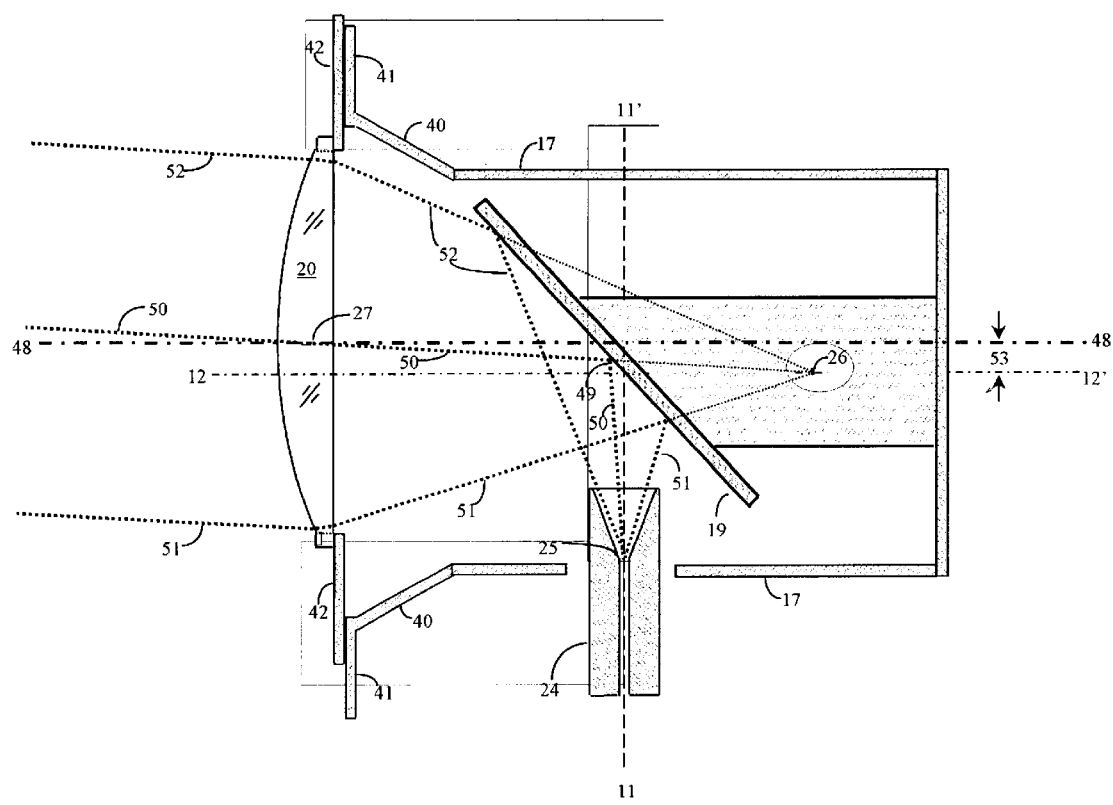
FIG. 3 provides a top level diagram of a shunt configuration for the self-test function, according to an embodiment of the invention.

FIG. 3 provides an alternate top level diagram of a shunt configuration for the self-test function. In this configuration, line 17 is replaced by lines 22 and 23 with the switch 14 positioned between these two lines. Line 16 and line 22 are both coupled to line 13 at junction point 21. Operation of this configuration is similar to that of the parallel configuration. When switch 14 is open, essentially all the electromagnetic energy collected by the test antenna 12 is routed to the dissipative load 18 and is converted to heat. When switch 14 is closed a substantial of the energy collected by the test antenna is routed via lines 22 and 23 to the short 19; whereupon, it is reflected back through the switch to junction point 21. A portion of this reflected energy proceeds via line 16 and is consumed in the dissipative load 18; the remainder of the reflected energy is routed by line 13 to the test antenna 12 where it is reradiated. The radar antenna 5 collects a portion of this reradiated energy and the radar processes it in the same manner as described for the parallel configuration of FIG. 2 above. Switch driver 15 provides the same function in controlling switch 14 as in the parallel configuration. The main advantage of the shunt configuration is that switch 14 has a single-pole single-throw structure, as compared to the single-pole double-throw structure required by the parallel configuration.

Figure 4:
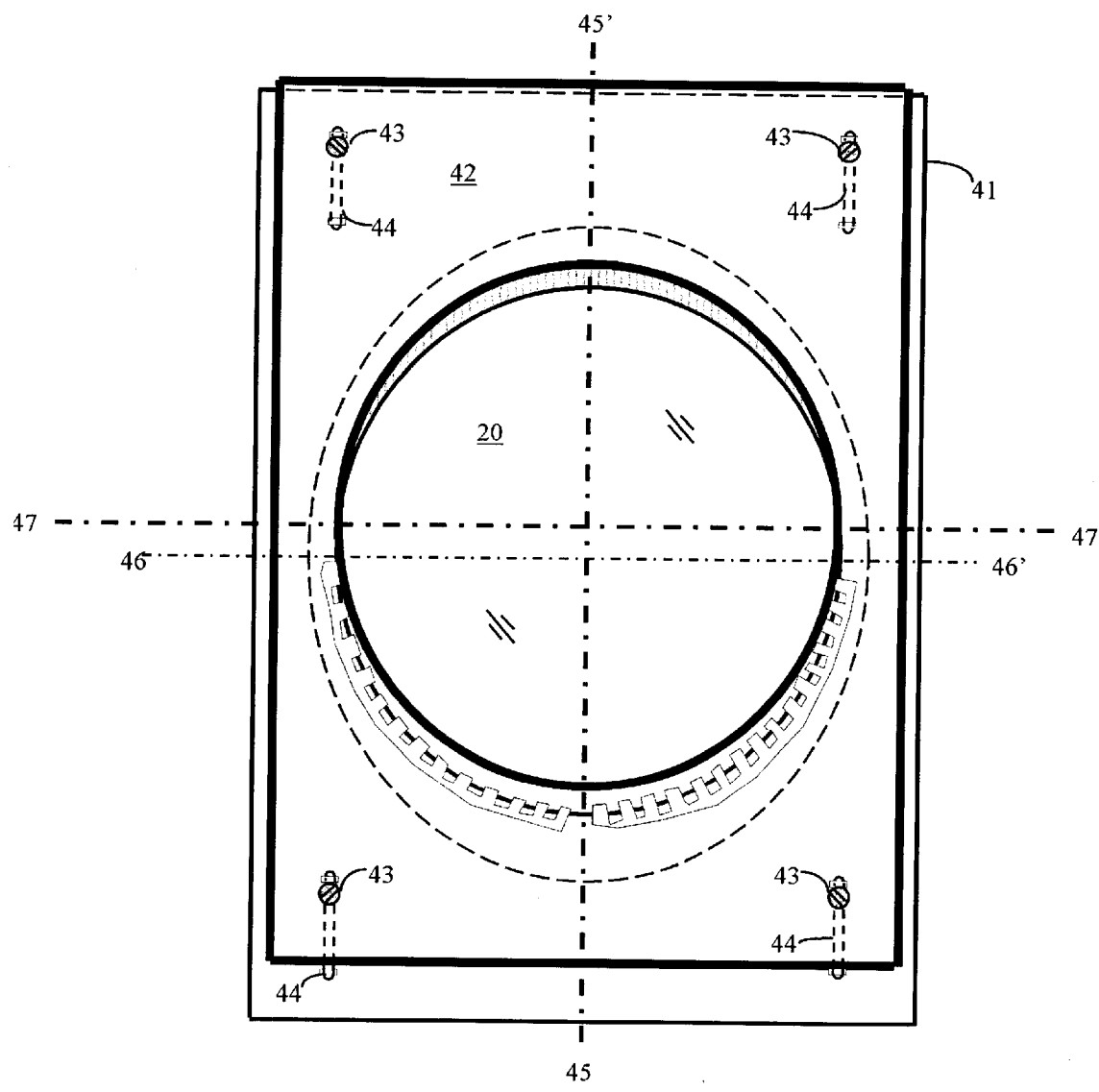
FIG. 4 presents a printed wiring board layout for a realizable example of the self-test function, according to an embodiment of the invention.

A realizable example of the self-test function is shown in FIG. 4. The solid line 30 defines the outer perimeter of a printed circuit board that has much of its back surface 31 covered by a substantially solid conductor that forms a ground plane. The dotted line 32 defines the outer perimeter of the ground plane. For this example, the board is a thin dielectric material having a thickness of 0.010 inches. The connecting lines and various other parts of the circuitry 33 are plated on the upper surface of the board using printed circuit methods well known to those of skill in the art.

Shown on the left is the test antenna 12. This antenna is a dipole with one arm printed on the top side of the board and the second arm printed on the back side as an extension of the ground plane. The dipole arms are each one-quarter wavelength long. Assuming an operating frequency of substantially 35.5 GigaHertz, each arm of the dipole has a length of 0.058 inches. The dipole arms should be 0.1 wavelength or less in width; thus, a width of 0.018 inches is used. The test antenna 12 is coupled to the remainder of the circuitry by a transmission line 35 having a characteristic impedance of 75 ohms.

The self-test circuitry follows the design of the shunt configuration of FIG. 3. The dissipative load function is provided by a resistor 36 and the switch 14 is realized in the form of a switching diode 37. The lines 16 and 22 shown in FIG. 3 coupled to the dissipative load 18 and the switch 14 are essentially eliminated in the realizable example of FIG. 4. The transmission line 35 is coupled to the resistor 36 and switching diode 37 by way of a matching transformer 38. If the switching diode had the ideal characteristics of an infinite impedance when open and zero impedance when closed; then a load resistor could be chosen with an impedance of 75 ohms to match that of the transmission line 35. Switching diodes available for use in the microwave and millimeter wave region of the spectrum usually have a package capacity of about 0.06 picofarads. When not conducting the packaged diode exhibits a capacitive reactance of approximately 75 ohms at 35.5 GigaHertz. Therefore, the impedance of the load resistor must be reduced if the circuit is to operate in accordance with the principles described for the shunt configuration of FIG. 3, above.

A quarter-wave matching transformer 38 with an impedance of substantially 50 ohms is coupled between the transmission line 35, and the resistor 36 and switching diode 37. This matching transformer transforms the line impedance to about 33 ohms at the connecting points of the load resistor and switching diode. A value of 33 ohms is chosen for the resistor 36. The 75 ohms capacitive reactance of the diode when not conducting is more than twice the value of the resistor so that most of the millimeter wave energy collected by the test antenna 12 is dissipated by the resistor and little is reflected by the non-conducting switching diode.

Switching diode 37 is coupled to pattern 43 that provides an effective short circuit for millimeter wave energy at the diode connection point. When the switching diode 37 is forward biased, its resistance is reduced to about 6 ohms. This resistance, in parallel with the 33 ohm resistance yields a combined resistance of substantially 5.1 ohms. This combination of a short coupled through a 6 ohm resistance in parallel with a 33 ohm dissipative load results in just over half the energy collected by the test antenna 12 being reflected back through the matching transformer 38 and transmission line 35 to the test antenna where it is re-radiated. Subsequently it is received and processed by the FM-CW radar.

The switching diode 37 is changed from the high impedance, or non-conducting state; to the low impedance, or conducting state, by changing the voltage applied between the +V terminal 39 and ground terminal 40. The non-conducting state occurs when no voltage is applied across the terminals. The conducting state occurs when a voltage of substantially +5 volts, with respect to ground, is applied to the +V terminal. The two terminals have plated-through holes located at their centers to facilitate the attachment of wires or other mechanism to supply the control voltage. Resistor 41 is coupled between the +V terminal and the switching diode to limit the switching diode forward conduction current to a suitable value for the diode selected.

One suitable value for resistor 41 is 10,000 ohms that will provide a current of approximately 0.45 milli-amperes with a control voltage of +5 volts.

A quarter-circle shaped pattern 42 of conducting material is coupled to resistor 36, and a similar pattern 43 is coupled to the switching diode 37. These quarter-circle shaped patterns have a radius that is substantially a quarter-wavelength. They function as quarter-wavelength long stubs of transmission line that are terminated in an open circuit, i.e. the circular edge of the pattern; to provide an apparent short to ground at the narrow, center of circle, end of the pattern. This pattern is a common practice by those of skill in the art to provide a low impedance for microwave or millimeter wave energy, but an open circuit for direct current and low frequency energy.

The printed wiring board assembly of FIG. 4 is coupled to the FM-CW radar antenna structure in a position to allow the test antenna 12 to collect a sample of the emitted millimeter wave energy. Switch driver 15 includes a circuit having the capability to generate a five volt amplitude square wave that is variable in frequency. The output of this circuit is coupled to the terminals 39 and 40. The design of variable frequency, square wave generators is well known to those of skill in the art. The range of frequencies provided by the switch driver is selected to provide a test target within the operating range of the radar, in accordance with equation 1. The frequency is typically calibrated in range rather than frequency.

When it is desired to test the operation of a FM-CW radar that includes the present invention, the operator initiates normal radar operation, and supplies power to the switch driver 15. The square wave frequency is adjusted as desired to produce a test target that is viewable on the radar display. The test target can be varied in range to evaluate the radar's performance at all ranges of interest.

Although shown in FIG. 1 as an integral part of the radar, the circuit of FIG. 4 and its associated switch driver can have the form of an independent assembly. In this form, testing of a FM-CW radar can be accomplished by temporarily placing the test antenna within the field of radiation of the radar's antenna, and performing a radar operational test in accordance with the procedure outlined above.

The circuit of FIG. 4 and its associated switch driver can also be used to evaluate the performance of a CW radar that does not modulate the transmitted energy. The most common usage of this variety of CW radar is to determine the velocity of targets by measuring the Doppler frequency shift in the received signal. For this application, the square wave frequency is adjusted to present a test target having an apparent velocity within the velocity range of interest for the radar under test. Those of skill in the art are familiar with the relationship for Doppler frequency shift, $F\_dop$, as given by equation 2: $F\_dop=(2 \times V \times F)/c$, where V is the target velocity, F is the operating frequency, and c is the speed of light.

It is noted that, although specific embodiments have been illustrated and described herein, those of ordinary skill in the art will recognize that any arrangement calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. An apparatus for use in evaluating the operational performance of a CW radar comprising:
    a test antenna to collect a sample of the CW radar emissions and to re-radiate a modulated variation of the sample;
    a transmission line, coupled to the antenna;
    a switch, coupled to the transmission line and responsive to a control signal, for connecting the transmission line to either one of two terminations;
    a dissipative load termination, coupled to the switch;
    an electromagnetic short termination, coupled to the switch; and
    a switch driver, coupled to the switch for the generation of a square wave control signal.

2. An apparatus as claimed in claim 1, wherein the test antenna is coupled to the field of radiation of the CW radar under test.

3. An apparatus as claimed in claim 1, wherein the dissipative load termination has an impedance that provides substantially complete dissipation of the sample of the CW radar emissions.

4. An apparatus as claimed in claim 1, wherein the electromagnetic short termination reflects substantially all the electromagnetic energy arriving at the termination back toward the switch.

5. An apparatus as claimed in claim 1, wherein the switch driver includes means to vary the frequency of the square wave control signal over a range that is equivalent to frequencies related to valid target signals occurring within the receiver portion of the CW radar under test.

6. An apparatus for use in evaluating the operational performance of a CW radar comprising:
    a test antenna to collect a sample of the CW radar emissions and to re-radiate a modulated variation of the sample;
    a transmission line, coupled to the test antenna;
    a connection point, coupled to the transmission line;
    a dissipative load termination, coupled to the connection point;
    a switch, coupled to the connection point and responsive to a control signal;
    an electromagnetic short termination, coupled to the switch; and a switch driver, coupled to the switch for the generation of a square wave control signal.

7. An apparatus as claimed in claim 6, wherein the test antenna is coupled to the field of radiation of the CW radar under test.

8. An apparatus as claimed in claim 6, wherein the dissipative load termination has an impedance that provides substantially complete dissipation of the sample of the CW radar emissions when the switch is in a non-conductive state.

9. An apparatus as claimed in claim 6, wherein the electromagnetic short termination reflects substantially all the electromagnetic energy arriving at the termination back toward the switch.

10. An apparatus as claimed in claim 6, wherein the transmission line, the connection point, and the switch have impedances that direct a substantial portion of the electromagnetic energy reflected by the electromagnetic short termination to the test antenna for re-radiation.

11. An apparatus as claimed in claim 6, wherein the switch driver includes means to vary the frequency of the square wave control signal over a range that is equivalent to frequencies related to valid target signals occurring within the receiver portion of the CW radar under test.

12. A method for evaluating the performance of a CW radar, the method comprising:

collecting a continuous sample of the CW radar emissions;

amplitude modulating the sample by alternately coupling the sample to a dissipative load termination, or to an electromagnetic short termination;

coupling the portion of the sample reflected by the electromagnetic short termination to the test antenna;

re-radiating the amplitude modulated sample by way of the test antenna;

receiving a portion of the re-radiated, amplitude modulated sample by the radar antenna;

processing the amplitude modulated sample by the radar in a manner similar to the processing performed on actual targets;

displaying the processed, amplitude modulated sample on the radar display in the form of a test target; and varying the displayed range of the test target within the range limits of the radar display as desired to test all radar circuits.

13. The method of claim 12 wherein collecting a continuous sample of the CW radar emissions includes placing the test antenna within the field of radiation of the CW radar antenna.

14. The method of claim 12 wherein alternately coupling the sample of the CW radar emissions to a dissipative load termination or to an electromagnetic short termination includes alternately driving a switching diode to its nonconductive state or to its conductive state.

15. A method of claim 12 wherein varying the displayed range of the test target includes adjusting the frequency of operation of the square wave generator that is coupled to the switching diode to control its conductive state.

* * * * *